United States Patent
Edpalm et al.

(10) Patent No.: US 9,805,287 B2
(45) Date of Patent: Oct. 31, 2017

(54) METHOD OF IDENTIFYING RELEVANT AREAS IN DIGITAL IMAGES, METHOD OF ENCODING DIGITAL IMAGES, AND ENCODER SYSTEM

(71) Applicant: AXIS AB, Lund (SE)

(72) Inventors: Viktor Edpalm, Lund (SE); Lars Persson, Malmö (SE); Xing Danielsson Fan, Lund (SE); Fredrik Pihl, Malmö (SE); Alexandre Martins, Malmö (SE)

(73) Assignee: AXIS AB, Lund (SE)

( * ) Notice: Subject to any disclaimer, the term of this patent is extended or adjusted under 35 U.S.C. 154(b) by 59 days.

(21) Appl. No.: 14/927,687

(22) Filed: Oct. 30, 2015

(65) Prior Publication Data
US 2016/0140421 A1    May 19, 2016

(30) Foreign Application Priority Data

Nov. 14, 2014    (EP) .................................... 14193288

(51) Int. Cl.
*G06K 9/62*    (2006.01)
*H04N 19/176*    (2014.01)
(Continued)

(52) U.S. Cl.
CPC ......... *G06K 9/6215* (2013.01); *H04N 19/119* (2014.11); *H04N 19/124* (2014.11);
(Continued)

(58) Field of Classification Search
CPC .. G06K 9/6215; H04N 19/119; H04N 19/124; H04N 19/14; H04N 19/172;
(Continued)

(56) References Cited

U.S. PATENT DOCUMENTS 6,101,276 A    8/2000    Adiletta et al.
6,832,006 B2    12/2004    Savakis et al.
(Continued)

FOREIGN PATENT DOCUMENTS

EP    0741496 A2    11/1996
EP    0986264 A2    3/2000
(Continued)

OTHER PUBLICATIONS

Loganathan, R. et al. "Medical Image Compression with Lossless Region of Interest Using Adaptive Active Contour", Journal of Computer Science 8 (5): 747-751 (2012).
(Continued)

*Primary Examiner* — Duy M Dang
(74) *Attorney, Agent, or Firm* — Volpe and Koenig, P.C.

(57) ABSTRACT

A method of identifying relevant areas in digital images is provided. The method comprises receiving information representative of pixels in a first digital image, and calculating a spatial statistical measure of said information for groups of neighboring pixels in said first image to form a group value for each group of pixels. Further, the method comprises calculating differences between group values, and comparing said differences to a predetermined threshold value. If said difference is equal to or above said threshold value, said group is identified as relevant, and if said difference is below said threshold value, said group is identified as not relevant. A method of encoding digital images based on the identification of relevant and non-relevant areas is also provided, as well as a digital encoder system.

6 Claims, 7 Drawing Sheets

(51) Int. Cl.
*H04N 19/119* (2014.01)
*H04N 19/124* (2014.01)
*H04N 19/14* (2014.01)
*H04N 19/85* (2014.01)
*H04N 19/172* (2014.01)
*H04N 19/182* (2014.01)
*H04N 19/60* (2014.01)

(52) U.S. Cl.
CPC .......... *H04N 19/14* (2014.11); *H04N 19/172* (2014.11); *H04N 19/176* (2014.11); *H04N 19/182* (2014.11); *H04N 19/60* (2014.11); *H04N 19/85* (2014.11)

(58) Field of Classification Search
CPC .... H04N 19/176; H04N 19/182; H04N 19/60; H04N 19/85
See application file for complete search history.

(56) References Cited

U.S. PATENT DOCUMENTS

| | | |
|---|---|---|
| 7,430,330 B2 | 9/2008 | Hamilton |
| 8,416,847 B2 | 4/2013 | Roman |
| 8,588,309 B2 | 11/2013 | Doepke |
| 2012/0275509 A1 | 11/2012 | Smith et al. |
| 2012/0307904 A1 | 12/2012 | Yi et al. |

FOREIGN PATENT DOCUMENTS

| | | |
|---|---|---|
| EP | 1315380 A2 | 5/2003 |
| WO | 2006110584 A2 | 10/2006 |
| WO | 2008077119 A2 | 6/2008 |

OTHER PUBLICATIONS

Sherki, Sandeep et al. "A Review on Design of Low Bit Rate Video Encoding for Image Compression", International Journal on Recent and Innovation Trends in Computing and Communication, vol. 2, Issue 8, 2088-2091 (Aug. 2014).

|       |       |       |
|-------|-------|-------|
| $V_{1,1}$ | $V_{1,2}$ | $V_{1,3}$ |
| $V_{2,1}$ | $V_{2,2}$ | $V_{2,3}$ |
| $V_{3,1}$ | $V_{3,2}$ | $V_{3,3}$ |

Fig. 6

|       |       |       |
|-------|-------|-------|
| $QP_{1,1}$ | $QP_{1,2}$ | $QP_{1,3}$ |
| $QP_{2,1}$ | $QP_{2,2}$ | $QP_{2,3}$ |
| $QP_{3,1}$ | $QP_{3,2}$ | $QP_{3,3}$ |

METHOD OF IDENTIFYING RELEVANT AREAS IN DIGITAL IMAGES, METHOD OF ENCODING DIGITAL IMAGES, AND ENCODER SYSTEM

CROSS REFERENCE TO RELATED APPLICATION

This application claims the benefit of European Patent Application No 14193288.9 filed on Nov. 14, 2014, which is incorporated by reference as if fully set forth.

FIELD OF INVENTION

The present invention relates to the field of digital image processing, and relates particularly to a method of identifying relevant areas in digital images, to a method of encoding digital images, and to an encoder system.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are called intra-frames, and may also be referred to as I-frames. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Further, the encoded frames are arranged in groups of pictures, or GOPs, where each group of pictures is started with an I-frame, and the following frames are P-frames or B-frames. The number of frames in a group of pictures is generally referred to as a GOP length. GOP lengths may vary from 1, meaning that there is just an intra-frame, and no inter-frames, in a group of pictures, to, e.g., 255, meaning that there is one intra-frame followed by 254 inter-frames in a group of pictures.

At the site of reception of the encoded video sequence, the encoded frames are decoded. A concern in network camera monitoring systems is the available bandwidth for transmission of encoded video. This is particularly true in systems employing a large number of cameras. Further, this concern is especially important in situations where available bandwidth is low, such as when the video sequence is to be transmitted to a mobile device, such as a mobile phone, a PDA, or a tablet computer. An analogous problem occurs regarding storage of images, for instance when storing images on an onboard SD card in the camera. A compromise has to be made, where available bandwidth or storage is balanced against the interest of high quality images. A number of methods and systems have been used for controlling the encoding in order to reduce the bit rate of transmissions from the cameras. These known methods and systems generally apply a bit rate limit, and control the encoding such that the output bit rate from the cameras is always below the bit rate limit. In this way, it may be ensured that the available bandwidth is sufficient, such that all cameras in the system may transmit their video sequences to the site of reception, e.g., a control centre, where an operator may monitor video from the cameras of the system, and where video may be recorded for later use. However, applying a bit rate limit to all cameras may lead to undesirably low image quality at times, since the bit rate limit may require severe compression of images containing a lot of details, regardless of what is happening in the monitored scene. Some details may be of interest to a viewer at the site of reception, whereas others may not be of interest. Still, when applying a bit rate limit, images with a lot of details may need to be heavily compressed in order not to exceed the limit, thereby leading to low image quality.

SUMMARY

It is an object of the present invention to provide a method of identifying relevant areas in an image. Another object is to enable efficient compression of digital images, allowing high quality images of interesting objects.

According to a first aspect, these and other objects are achieved, in full or at least in part, by a method of identifying relevant areas in digital images, said method comprising receiving information representative of pixels in a first digital image, calculating a sum, a mean, or a median of said information for groups of neighboring pixels in said first image to form a group value for each group of pixels, calculating differences between group values, and comparing said differences to a predetermined threshold value. If said difference is equal to or above said threshold value, the method comprises identifying said group as being in a relevant area, and if said difference is below said threshold value, the method comprises identifying said group as being in a not relevant area. With such a method, it may be possible to differentiate relevant areas from not relevant areas in an image. This differentiation or sub-division of the image may be used to various ends, such as for controlling encoding of the image.

The relevant areas may be areas containing relevant objects, relevant objects being objects such as people, faces, animals, vehicles, license plates, windows, doors, gates, or objects carried by people.

In a variant of the method, the groups of pixels include a number of pixels adapted to produce differences below said threshold value between group values in areas of the first digital image not containing relevant objects.

Each of said groups of pixels may include at least 256 pixels. This may be a 16×16 pixel group, and this size of pixel group may correspond to the size of a face in the image.

The information representative of pixels in the first image may be at least one from the group consisting of data on luminance, light intensity, color values, and a variance of any of these. The variance may, e.g., be expressed as a standard deviation.

In a variant, the method further comprises receiving information representative of pixels in a second digital image, calculating a sum, a mean, or a median of said information for groups of neighboring pixels in said second image to form a group value for each group of pixels, and accumulating the group values of corresponding groups from said first image and said second image, wherein the calculating of differences between group values is performed using said accumulated group values.

According to a second aspect, these and other objects are achieved, in full or at least in part, by a method of encoding digital images, comprising identifying relevant areas using the method of the first aspect, setting a compression value for each group of pixels based on the identification of relevant areas, wherein blocks in relevant areas are given a first compression value, and blocks outside the relevant areas are given a second compression value, said second compression value being representative of a compression giving a lower image quality than the first compression value, and encoding the first image using the compression values set for the groups of pixels. With such a method it is possible to keep a number of bits used for representing not relevant areas of an image down, while allowing high quality representation of relevant areas of the image. The blocks to which the compression values are assigned may or may not be identical to the groups of pixels used for identifying relevant areas. The blocks may be subgroups of the groups of pixels.

According to a variant of the method, a group of pixels having a second compression value is encoded as a skip block. In this manner, an output bit rate may be reduced.

The method may further comprise processing the first image in a transformation module before encoding the first image, and processing the group values or compression values corresponding to the image in the transformation module before encoding the first image. The transformation module may be a hardware accelerated transformation module, and may sometimes be referred to as a scaler. A transformation module or scaler may perform operations such as resizing, cropping, rotating, addition of privacy mask, or electronic image stabilization.

According to a third aspect, the abovementioned objects are achieved, in full or at least in part, by a digital image encoder system for encoding image data corresponding to input images comprising an encoder module arranged to process input images using compression values, a receiving module arranged to receive information representative of pixels in a first digital image, a group value module arranged to calculate a sum, a mean, or a median of said information for groups of neighboring pixels in said first image to form a group value for each group of pixels, a difference calculation module arranged to calculate differences between group values, a comparing module arranged to compare said differences to a predetermined threshold value, an identification module arranged to identify a group of pixels as being in a relevant area if said difference is equal to or above said threshold value, and to identify said group of pixels as being in a not relevant area if said difference is below said threshold value, and a compression value setting module arranged to set a compression value for each group of pixels based on the identification of relevant areas, such that groups of pixels in relevant areas are given a first compression value, and groups of pixels in not relevant areas are given a second compression value, said second compression value being representative of a compression giving a lower image quality than the first compression value. With such an encoder system, it is possible to reduce output bit rates, while also allowing high quality images of interesting objects in a monitored scene.

The encoder system of the third aspect may generally be embodied in the same ways as the method of the second aspect, with accompanying advantages.

According to a fourth aspect, the abovementioned objects are achieved, in full or at least in part, by a camera comprising a digital encoder system according to the third aspect.

According to a fifth aspect, the abovementioned objects are achieved, in full or at least in part, by a computer program product comprising a computer-readable storage medium with instructions adapted to carry out the methods according to the first and second aspects when executed by a processor. The processor may be any kind of processor, e.g., a central processing unit (CPU), a graphics processing unit (GPU), a custom made processing device implemented in an integrated circuit, an ASIC, an FPGA, or logical circuitry including discrete components.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
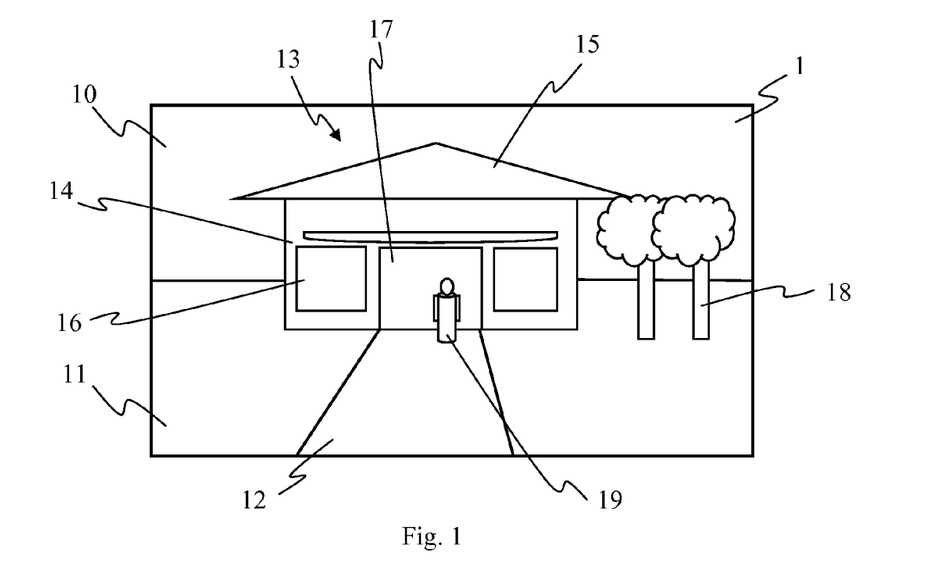
FIG. 1 is a view of a digital image depicting a monitored scene.
Figure 2:
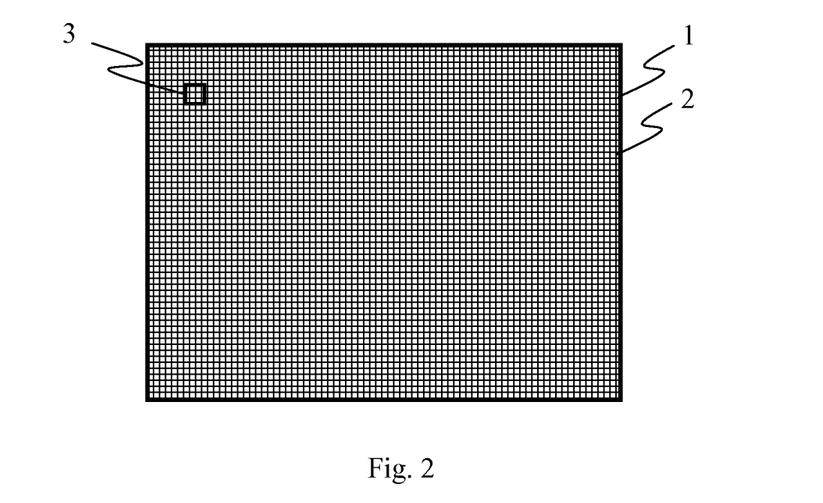
FIG. 2 is an illustration of a principal structure of the image in FIG. 1.
Figure 3:
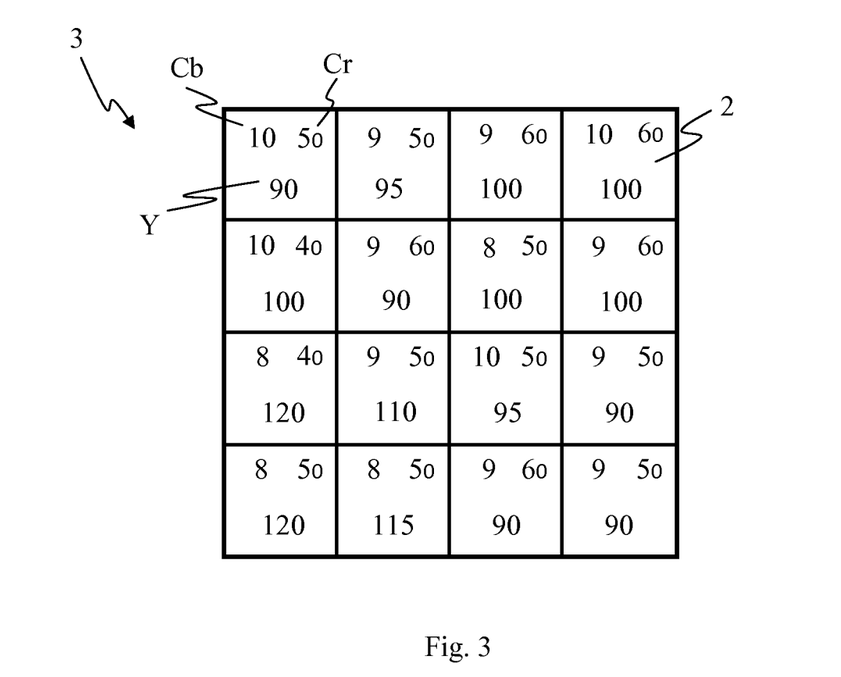
FIG. 3 is a detail view of part of the image shown in FIG. 2.

FIG. 1 illustrates a digital image 1 depicting a monitored scene. This image 1 is one of a sequence of images in a video sequence captured by a digital monitoring camera. In FIG. 2, the principal construction of the image, as made up of a number of pixels 2, is illustrated. The image 1 may for instance be 1280 pixels wide and 960 pixels high, thus having about 1.3 MP. This digital image 1 is represented in a YCbCr color space, meaning that each pixel 2 has a luminance value Y, a chromaticity blue value Cb, and a chromaticity red value Cr. In FIG. 2, a small part of the image 1, schematically indicated by a box 3 in FIG. 1, is illustrated. This small part of the image 1 is four pixels wide by four pixels high. For each pixel 2 in FIG. 3, a number at the top left corner represents the Cb value, a number at the top right corner represents the Cr value, and a number at the bottom represents the Y value for that pixel.

When the image 1 is to be transmitted to, e.g., a control center, where an operator or a guard may watch displayed images of monitored scenes, the image has to be encoded. In this example, a codec working according to the H.264 compression format is used. When encoding the image 1, parameters such as GOP length and compression value may be controlled in order to control the amount of data required for transmitting the encoded image, i.e. in order to control an output bit rate. In the H.264 compression format, the compression value will be the quantization parameter QP. The image to be encoded is partitioned into independent blocks, called macro blocks or pixel blocks, which are encoded individually. Thus, different macro blocks in one and the same image may be assigned different compression values. A frame rate at which images are encoded may also be controlled for controlling the output bit rate. Available bandwidth for transmission will generally limit the allowable bit rate. In systems employing a plurality of cameras, and in systems with small bandwidth, such as when transmitting images to a user's mobile phone, the allowable bit rate output from each individual camera may be quite restricted. As already indicated in the background section above, applying a bit rate limit may require severe compression and/or long GOP lengths, resulting in low quality images, possibly with an annoying amount of encoding artifacts.

According to the invention, these problems are solved by identifying relevant areas in the image 1. Relevant areas are areas in which there are relevant objects. What objects are judged to be relevant objects will differ from one monitoring situation to another. For instance, if a perimeter around a building is monitored for intruders, humans will be relevant objects. As another example, at a toll booth, license plates of cars will be relevant objects. In general, relevant objects may be objects such as people, faces, animals, vehicles, license plates, windows, doors, gates, objects carried by people, valuable objects, such as paintings, and essential equipment such as defibrillators or keys for emergency exits.

Once relevant areas have been identified, different macro blocks in the image may be encoded using different compression values depending on if a specific macro block is in a relevant area or in a non-relevant area. By applying a high compression value to non-relevant areas, details will be lost in encoding. However, such detail loss will generally be acceptable to the viewer of the transmitted image, since details in non-relevant areas are not important to the purpose of the current monitoring. For instance, returning again to the example of monitoring a perimeter around a building for intruders, moving leaves in a tree at a fence around the building are not important, and therefore, the tree need not be shown with a high degree of detail. However, people moving close to the fence may be intruders, and therefore it is useful to show them with a high degree of detail, such that they may be recognized as people, and possibly even identified. In order to get the desired image quality in the relevant areas, a lower compression value is used for macro blocks in the relevant areas.

With reference once more to FIG. 1, the monitored scene contains a sky 10, a lawn 11, a path 12 and a house 13. The house 13 has walls 14, a roof 15, windows 16, and a door 17. Beside the house 13, there are two trees 18, and a person 19 is standing in front of the door 17. Different parts of the image contain different amounts of details. For instance, a blue sky contains few details, and a cloudy sky generally contains large masses of white or grey against a blue or grey background. On the other hand, the lawn 11, with its grass, contains a lot of small details, as do the trees 18 with their leaves. When monitoring the scene captured in the image 1, the sky 10, the lawn 11, and the trees 18 will normally not be interesting. Instead, the person 19 may be interesting, as well as the windows 16 and door 17, where additional interesting objects could appear.

The invention is based on the realization that the interesting or relevant parts of an image, such as the image 1 shown in FIG. 1, contain details on another scale than the non-interesting or non-relevant parts, and on how to differentiate the interesting parts from the non-interesting parts. For instance, if the purpose of the monitoring is to identify people in the area surrounding the house, details having a scale or size on the order of details of people, such as faces, clothing etc. are interesting, whereas the blue sky is too large, and leaves and grass are too small. The differentiation of these scale classes of details is based on evening out details over a suitable sub-portion of the image. Once again taking the example of monitoring for identifying people, if the sub-portions of the image are chosen having a size of about 20×20 pixels, this may correspond to a size of a face required for recognition. In a 20×20 pixel sub-portion of the sky 10, there will most likely be almost only blue pixels or almost only white pixels, and the same will be true for neighboring sub-portions depicting the sky. In a 20×20 pixel sub-portion of the lawn 11, there will most likely be pixels of varying green tones, but the average green color, or the sum of all pixel values, of one such sub-portion will be essentially the same as that of neighboring sub-portions of the lawn. The face of the person 19 will take up most of a 20×20 pixel sub-portion and the skin tone of the person 19 will differ from the average color of neighboring sub-portions depicting parts of the door 17 behind the person. Therefore, by choosing an appropriate size of sub-portions of the image over which to average or sum the color and comparing the sub-portions to their neighbors, relevant areas of the image may be identified as those that contain sub-portions whose color average or color sum differs from the color average or color sum of the neighbors.

Figure 4A:
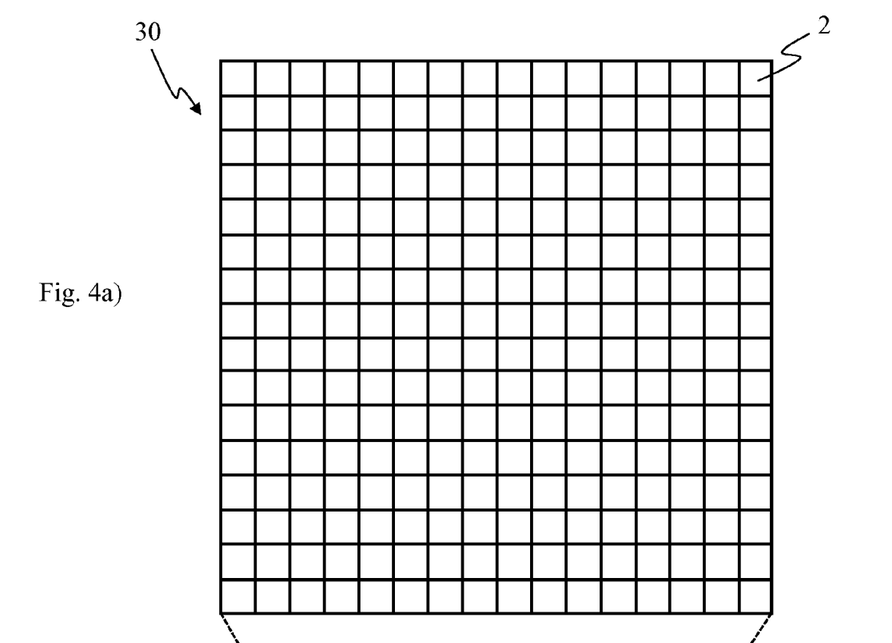
FIGS. 4a) and 4b) are an illustration of a group of pixels of the image shown in FIG. 2.

In the following, a variant of the inventive method will be described in closer detail with reference to FIGS. 2-7. As already discussed, the image 1 is made up of a number of pixels 2, in this example 1280×960 pixels. The image 1 is divided into groups of pixels (step S01 in FIG. 5), each group 30 in this example being made up of 16×16 pixels, i.e. 256 pixels, as illustrated in FIG. 4a. For each pixel 2 in the group 30 information representative of the pixel 2 is received (step S02 in FIG. 5). In this example, the representative information is the luminance Y. A sum of the luminance values of all pixels 2 in the group 30 is calculated to form a group value V (step S03 in FIG. 5).

$$V = \sum_{n=1}^{N} Y_n$$

Here, $Y_n$ is the luminance value of the n:th pixel and N is the total number of pixels in the group 30. Thus, in this example N=256. The sum of the luminance values is just one of many possible statistical measures that may be used for calculating the group value V. Other ways of calculating the group value V is to calculate statistical measures such as a mean, or a median, of the luminance values of the pixels of the group. Using more complex and processing heavy calculations the statistical measures calculated could alternatively be an interquartile range, a standard deviation, a variance, a skewness, or a kurtosis of the luminance values of the pixels of the group.

In the same manner, a group value is calculated for each group of pixels in the image 1. In the example image 1, there are 80×60 groups, i.e. 4800 groups.

Figure 4B:
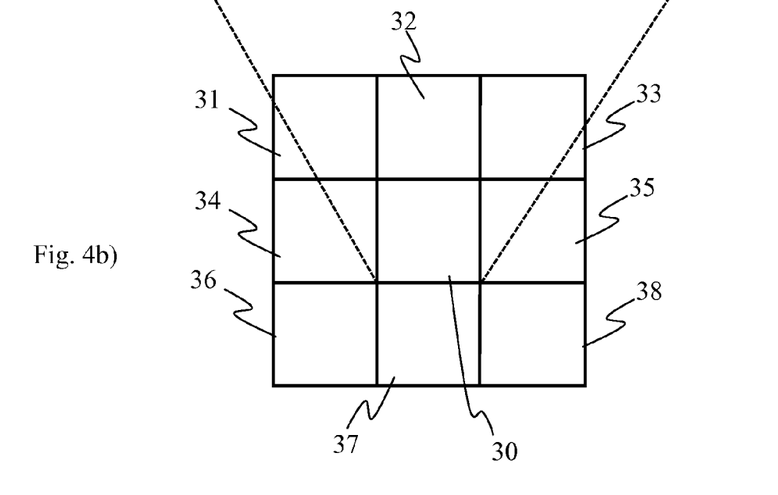
Figure 5:
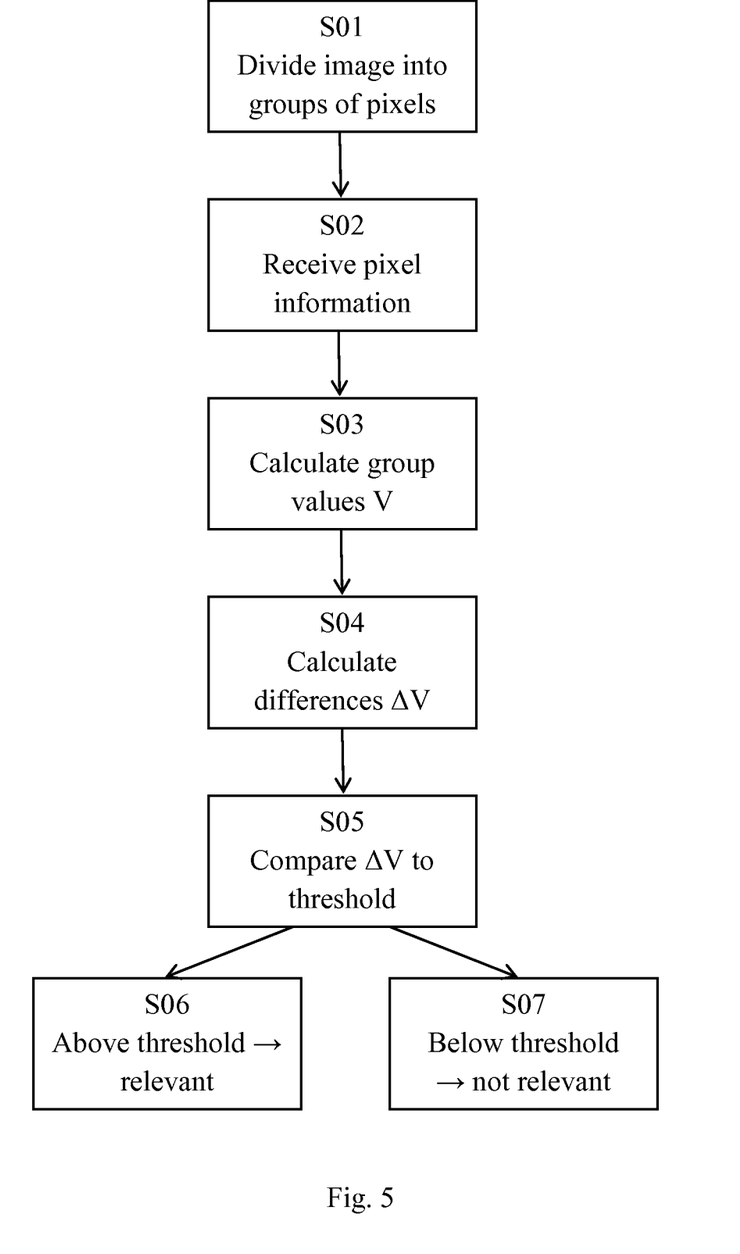
FIG. 5 is a flow chart showing a variant of the inventive method.

The group value V calculated for the group 30 is then compared to the group values of neighboring groups of pixels. As shown in FIG. 4b, the group 30 of pixels is surrounded by eight other groups 31-38 of pixels, for which group values have also been calculated. A difference ΔV between the group value V of the group 30 and its neighbors 31-38 is calculated (step S04), and the difference is compared to a predetermined threshold value (step S05). The threshold value may, e.g., be set based on how much an average pixel should differ between the group 30 and its neighbors 31 38. For instance, for a 16×16 pixel group, i.e. a group of 256 pixels, the threshold value may be set to 256, meaning that an average difference in luminance of 1 in each pixel in the group would be considered to be different enough to be above the threshold value. If the difference between the group value V of the group 30 and its neighbors 31-38 is equal to or above the threshold, the group 30 of pixels is identified as being in a relevant area of the image 1 (step S06). Conversely, if the difference between the group value V of the group 30 of pixels and its neighbors is below the threshold, the group 30 is identified as being in an area which is not relevant (step S07). This comparison of group values may be performed using any edge detector filter, such as Laplace, Sobel, Canny, Laplace of Gaussian, or Difference of Gaussian.

All groups of pixels throughout the image 1 are in this manner compared to their neighbors, and hereby the image 1 may be divided into relevant areas and not relevant areas.

Figure 6:
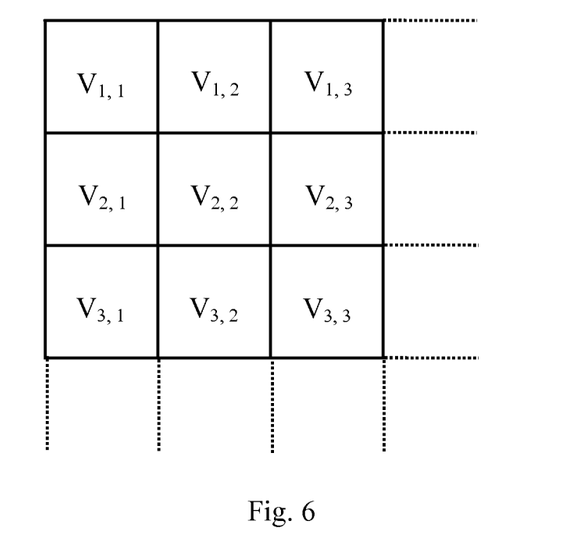
FIG. 6 is an illustration of group values of groups of pixels in FIG. 2 arranged in correspondence with the groups of pixels.

A temporal filtering may be performed by accumulating group values of several image frames in a video sequence. The group values may be stored in positions corresponding to the positions of the groups of pixels in a first image. FIG. 6 shows an example of part of such a map of group values V. In this illustration, $V_{R, C}$ represents the group value for a group of pixels in row R, column C of the map. An accumulated map of group values is formed by, for each group of pixels, adding a weighted group value calculated for a new image frame to a weighted sum of group values for preceding frames, i.e. using an infinite impulse response filter. Thus, for each group of pixels an accumulated group value may be calculated according to the following formula:

$$V_{acc\ m} = (1-\alpha) \cdot V_{acc\ m-1} \alpha \cdot V_m$$

Here, m is the number of the current image frame in the video sequence, $V_{acc\ m-1}$ is the accumulated group value for the preceding images, and α is a weighting factor. The weighting factor α is chosen depending on the level of noise in the images. For instance, α may be set to 0.25. If there is a high noise level in the images, the weighting factor α may be set lower. If there is no noise in the images, there is no need to temporally filter the group value differences, i.e. α may be set to 1.

Figure 7:
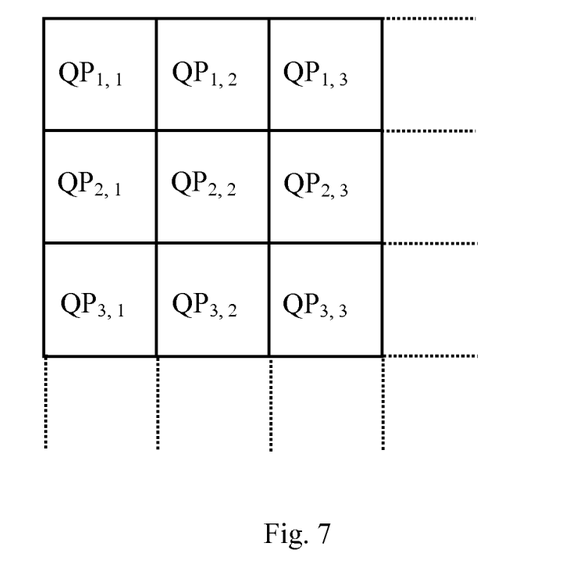
FIG. 7 is an illustration of compression values arranged in correspondence with the groups of pixels.

Once the relevant and not relevant areas of the image 1 have been identified, this division of the image may be used as a basis for encoding the image 1. The quantization parameter to be used when encoding a macro block is here set depending on whether this macro block is in a relevant area of the image 1 or in a not relevant area of the image 1. It should be noted that the macro blocks used for encoding may correspond to the groups of pixels, such that if the groups of pixels have 16×16 pixels, the macro blocks used for encoding have the same 16×16 pixels. Alternatively, the groups of pixels may be larger than the macro blocks, e.g., one 32×32 group of pixels corresponding to four 16×16 pixel macro blocks. For macro blocks in relevant areas of the image 1 a first compression value, e.g. QP=25, is set, and for macro blocks in non-relevant areas of the image 1, a second compression value, e.g., QP=38, is set. As may readily be seen, the first compression value is lower than the second compression value, and thereby, in the encoded, transmitted and decoded image, the image quality of the relevant areas will be higher than the image quality of the non-relevant areas. Instead of setting compression values QP, changes in compression value ΔQP may be set. For instance, an initial compression value, e.g., QP=28 may be set for all macro blocks. Based on the identification of relevant and not relevant areas, changes from this initial or default compression value may be set for each macro block using the same principle as described above. The QP values or the changes ΔQP set for each macro block may be stored in positions corresponding to the positions of the macro blocks in the image, forming a map corresponding to the image 1, such as indicated in FIG. 7. In this map of compression values, $QP_{R,\ C}$ represents the compression value for a group of pixels in row R, column C of the map.

Instead of temporally filtering group values as described above, group value differences may be temporally filtered by the same kind of accumulation. Thus, group value differences may be stored in positions corresponding to the groups of pixels in the image, each group value difference being the difference between the group value of a respective group of pixels and the group values of the neighboring groups of pixels. The group value differences are then accumulated over time. Further, compression values based on the group value differences may be temporally filtered instead, using the same principle of weighting as described for the group values.

The inventive method works with intra-frame encoding as well as with inter-frame encoding. If an image to be encoded is to be encoded as an inter-frame, e.g., as a P-frame, some macro blocks may be encoded as so called skip blocks. When encoding a skip block, the content of the macro block at the corresponding location in the previous image frame is copied to the current image frame. Skip blocks may be used in areas of the image where there is no motion or change, for instance a static background in a scene where light conditions are not changing. Thereby, less data is needed for representing the current image frame. The identification of relevant and not relevant areas of the image may be used for determining which macro blocks to encode as skip blocks. For instance, macro blocks in not relevant areas of the image may be set to be encoded as skip blocks.

Before encoding, the image 1 may be processed in a hardware accelerated transformation module or scaler, where an operation such as rotation, cropping, addition of privacy mask, or electronic image stabilization may be performed. The compression values should be processed in the same scaler, such that the set compression values actually correspond to the correct groups of pixels or macro blocks in the image after scaling. Alternatively, the group value differences may be processed in the scaler before setting the compression values.

In summary, by employing the inventive methods, it is possible to reduce bit rate when transmitting digital images, while still enabling high quality presentation of interesting details in a monitored scene. The size of the groups of pixels is chosen depending on the purpose of the images. Thus, the number of pixels in each group is adapted to produce differences below the threshold value between group values in areas of the first digital image not containing relevant objects. The groups of pixels may range from 8×8 or 16×16 pixels and upwards depending on the scale of details in relevant objects.

Figure 8:
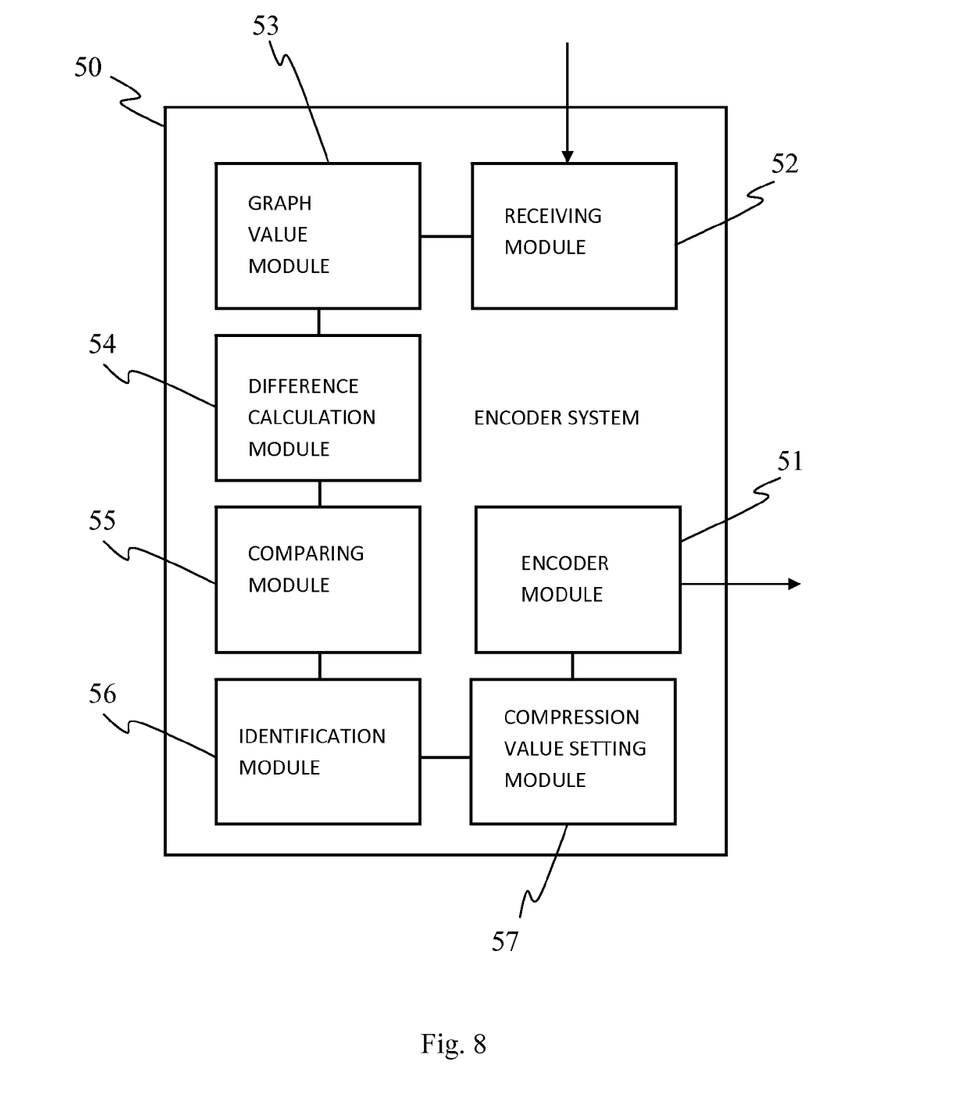
FIG. 8 is a representation of an encoder system according to an embodiment.
Figure 9:
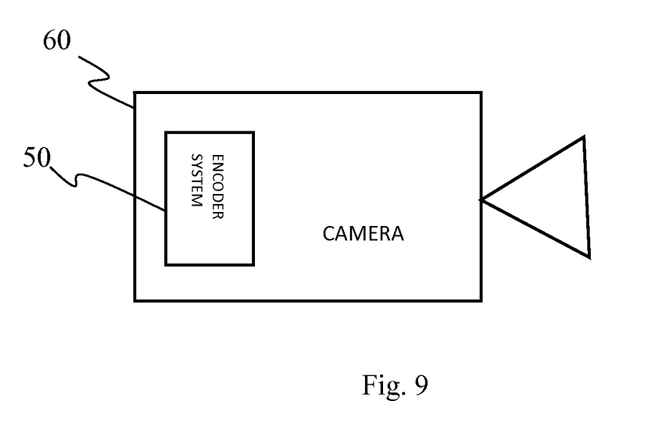
FIG. 9 shows a camera with an integrated encoder system.

In FIG. 8, an encoder system 50 which may be used in accordance with the methods above is schematically shown. The encoder system 50 comprises an encoder module 51 arranged to process input images using compression values. The encoder system 50 further comprises a receiving module 52 arranged to receive information representative of pixels in images, such as the first image 1, and a group value module 53 arranged to calculate a sum of the information for groups of neighboring pixels in each image. Still further, a difference calculation module 54 is arranged to calculate differences between group values of neighboring groups of pixels. A comparing module 55 is arranged to compare the differences to a predetermined threshold value. An identification module 56 is arranged to identify a group of pixels as being in a relevant area if the difference is equal to or above the threshold value, and to identify the group of pixels as being in a not relevant area if the difference is below the threshold value. A compression value setting module 57 is arranged to set a compression value for each group of pixels based on the identification of relevant areas. The setting is done such that groups of pixels in relevant areas are assigned a first compression value, and groups in not relevant areas are assigned a second compression value, the second compression value being representative of a compression giving a lower image quality than the first compression value. The encoder system 50 may be operated as described above in connection to FIGS. 2-7. The encoder system 50 may be embodied as hardware, firmware, or software, or as a combination thereof. It may be integrated in a camera 60, such as indicated in FIG. 9, or may be operatively connected thereto. The camera may be a digital camera. Otherwise, the encoder system may be connected to an analog camera via a video digitalization unit converting analog signals into digital signals.

It will be appreciated that a person skilled in the art can modify the above described embodiments in many ways and still use the advantages of the invention as shown in the embodiments above. As an example, in the description above, the digital image has been transformed into a YCbCr color space, and the luminance values are used for calculating group values. However, one of the chromaticity values Cb and Cr could be used instead.

Further, the digital image could be converted into another color space, such as RGB, where one of the color channels R (red), G (green), or B (blue) may be used for calculating group values.

Still further, image data directly from the image sensor, before Bayer filtering, could be used. Here, the image is represented as one grey level per pixel, and these may be used for calculating group values. The grey levels may also be seen as light intensity values.

It should thus be understood that the pixel information may be received from any stage of the image pipeline or video pipeline, and that the particular type of information will depend on wherefrom in the pipeline the information is derived.

Instead of using color values, light intensity values, or luminance values for calculating the group values, a variance of any of these may be used.

In the description above, the group values are calculated by forming sums of the information representative of the pixels, and here more specifically the luminance values of the pixels. However, as already indicated, the group values may instead be calculated by calculating a mean or a median of the information. Moreover, the group values may be made by means of more complex and calculation intensive calculations resulting in an interquartile range, a standard deviation, a variance, a skewness, a kurtosis or a higher power statistical measure of the information.

The skilled person will realize that the division of the image into relevant and not relevant areas may be further refined by using more thresholds for the differences between the group values. Thus, areas may be identified as being of a first level of relevance if the difference between group values is equal to or above a first threshold value, as being of a second level of relevance if the difference between group values is equal to or above a second threshold value, but below the first threshold value, and they may be identified as being not relevant if the difference between group values is below the second threshold value. Correspondingly, different compression values may be used for these areas of differing relevance. For instance, a first compression value may be set for macro blocks in areas of the first relevance level, a second compression value may be set for macro blocks in areas of the second relevance level, and a third compression value may be set for macro blocks in areas that are not relevant. The third compression value may in this case be representative of a compression giving a lower image quality than the second compression value, which in turn may be representative of a compression giving a lower image quality than the first compression value. In another variant, a first compression value may be set for macro blocks in areas of the first level of relevance, a second compression value implying a lower image quality may be set for macro blocks in areas of the second level of relevance, and macro blocks in not relevant areas may be encoded as skip blocks.

In the example described above, the compression format used by the codec is H.264. It should be understood that other block based hybrid codecs, e.g., a H.265, MPEG-4 Part 2, or VP9 codec, may be used as well, as long as they allow spatial control of the compression.

Possibly, the threshold value used for comparing differences in group values could be set such that a low threshold value signifies a large difference, and a high threshold value signifies a small difference. It should be realized that, with such a threshold value, the principles of the invention are still valid, although relevant areas will instead be those comprising groups of pixels with differences below the threshold value. Similarly, other kinds of compression values could be used, for which a high value signifies high image quality and a low value signifies low image quality. Even so, the inventive principle of compressing relevant areas less, giving a high image quality, and compressing not relevant areas more, giving a low image quality, still applies.

Above, the invention has been described in the context of motion video sequences, such as video sequences from a monitoring camera. However, the inventive methods may be used to advantage also for still images.

The camera may be any type of camera, e.g., a camera employing visible light, an IR camera or a thermal camera.

Further, although the invention has been discussed in connection with digital cameras, it may also be used with analog cameras. In such case, images from an analog camera may be converted to digital format using a digitalization unit.

The digital images may also be generated by a visual light sensor, a thermal sensor, a time-of-flight sensor, or other types of image generating sensors capable of generating information representative of pixels to be encoded using block based encoding technologies.

For ease of description, pixel information, group value differences and compression values have been described in the form of matrices. However, all such data may be stored in other forms.

In the description above, the identification of relevant areas in an image is utilized for setting different compression values for different areas in the image when encoding the image. However, the identification of relevant areas may also be used to other ends. For instance, the identification could be used for automatically marking interesting areas in a displayed image or for triggering events. It could also be used as a basis for tagging or describing objects or areas with metadata. Further, it could be used for providing feedback to a noise reduction filter.

Thus, the invention should not be limited to the shown embodiments but should only be defined by the appended claims.

What is claimed is:

1. A method of encoding digital images, comprising
receiving information representative of pixels in a first digital image,
calculating a sum, a mean, or a median of said information for groups of neighboring pixels in said first image to form a group value for each group of pixels,
calculating differences between group values,
comparing said differences to a predetermined threshold value,
if said difference is equal to or above said threshold value, identifying said group as being in a relevant area,
if said difference is below said threshold value, identifying said group as being in a not relevant area,
setting a compression value (QP) for each group of pixels based on the identification of relevant areas, wherein macro blocks in relevant areas are given a first compression value, and macro blocks outside the relevant areas are given a second compression value, said second compression value being representative of a compression giving a lower image quality than the first compression value, and
encoding the first image using the compression values set for the groups of pixels.

2. The method according to claim 1, wherein a group of pixels having a second compression value is encoded as a skip block.

3. The method according to claim 1, further comprising:
processing the first image in a transformation module before encoding the first image, and
processing the group values or compression values (QP) corresponding to the image in the transformation module before encoding the first image.

4. A non-transitory computer program product comprising a computer-readable storage medium with instructions adapted to carry out the method according to claim 3 when executed by a processor.

5. A digital image encoder system for encoding image data corresponding to input images comprising:
an encoder module arranged to process input images using compression values,
a receiving module arranged to receive information representative of pixels in a first digital image,
a group value module arranged to calculate a sum, a mean, or a median of said information for groups of neighboring pixels in said first image to form a group value for each group of pixels,
a difference calculation module arranged to calculate differences between group values,
a comparing module arranged to compare said differences to a predetermined threshold value,
an identification module arranged to identify a group of pixels as being in a relevant area if said difference is equal to or above said threshold value, and to identify said group of pixels as being in a not relevant area if said difference is below said threshold value, and
a compression value setting module arranged to set a compression value (QP) for each group of pixels based on the identification of relevant areas, such that groups of pixels in relevant areas are given a first compression value, and groups of pixels in not relevant areas are given a second compression value, said second compression value being representative of a compression giving a lower image quality than the first compression value.

6. A camera comprising a digital encoder system according to claim 5.

* * * * *